(12) United States Patent
Sawada

(10) Patent No.: US 8,010,274 B2
(45) Date of Patent: Aug. 30, 2011

(54) VEHICLE DRIVING SUPPORT APPARATUS WITH TARGET POSITION ARRIVAL DETERMINATION

(75) Inventor: Shinji Sawada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 762 days.

(21) Appl. No.: 11/319,551

(22) Filed: Dec. 29, 2005

(65) Prior Publication Data
US 2006/0149455 A1    Jul. 6, 2006

(30) Foreign Application Priority Data

Jan. 6, 2005   (JP) .................................. 2005-001844

(51) Int. Cl.
*B60T 7/12* (2006.01)
(52) U.S. Cl. ................. 701/96; 701/78; 701/79; 701/93
(58) Field of Classification Search ............... 701/27, 701/94, 98, 116, 302, 23, 48, 93, 96, 117, 701/119, 330, 301
See application file for complete search history.

(56) References Cited

U.S. PATENT DOCUMENTS

| | | | | |
|---|---|---|---|---|
| 5,710,565 A * | 1/1998 | Shirai et al. | .................. | 342/70 |
| 6,154,168 A * | 11/2000 | Egawa et al. | .................. | 342/71 |
| 6,161,073 A * | 12/2000 | Tange et al. | .................. | 701/96 |
| 6,256,573 B1 * | 7/2001 | Higashimata | .................. | 701/96 |
| 6,285,944 B1 * | 9/2001 | Tange et al. | .................. | 701/96 |
| 6,311,122 B1 * | 10/2001 | Higashimata | .................. | 701/96 |
| 6,351,702 B1 * | 2/2002 | Tange et al. | .................. | 701/96 |
| 6,370,470 B1 * | 4/2002 | Yamamura et al. | .................. | 701/96 |
| 6,415,217 B1 * | 7/2002 | Higashimata et al. | .................. | 701/96 |
| 6,470,257 B1 * | 10/2002 | Seto | .................. | 701/96 |
| 6,505,111 B1 * | 1/2003 | Tange et al. | .................. | 701/96 |
| 6,640,181 B2 * | 10/2003 | Akabori et al. | .................. | 701/96 |
| 6,687,595 B2 * | 2/2004 | Seto et al. | .................. | 701/96 |
| 6,856,887 B2 * | 2/2005 | Akabori et al. | .................. | 701/96 |
| 6,870,468 B2 * | 3/2005 | Sugano | .................. | 340/435 |
| 6,927,699 B2 * | 8/2005 | Samukawa et al. | .................. | 340/903 |
| 6,941,216 B2 * | 9/2005 | Isogai et al. | .................. | 701/96 |
| 6,985,805 B2 * | 1/2006 | Sudou et al. | .................. | 701/96 |
| 7,002,452 B2 * | 2/2006 | Watanabe et al. | .................. | 340/436 |
| 7,030,775 B2 * | 4/2006 | Sekiguchi | .................. | 340/903 |

(Continued)

FOREIGN PATENT DOCUMENTS

JP          05-104977          4/1993

*Primary Examiner* — Thomas G Black
*Assistant Examiner* — Sze-Hon Kong
(74) *Attorney, Agent, or Firm* — Smith, Gambrell & Russell, LLP

(57) ABSTRACT

In automatic following control in a travel control unit of a driving support apparatus, a prerequisite inter-vehicle distance to a front vehicle is set, a time to reaching this requisite inter-vehicle distance is set as a control target time, an estimated position of the front vehicle after the control target time elapses is computed, an acceleration from a present vehicle speed that will bring to a preset target inter-vehicle distance the inter-vehicle distance to the front vehicle at an own vehicle speed as of when the control target time elapses is computed as a target acceleration on the basis of the present inter-vehicle distance to the front vehicle and the estimated position of the front vehicle after the control target time elapses, and automatic braking control and automatic acceleration control are carried out to follow the front vehicle.

13 Claims, 9 Drawing Sheets

U.S. PATENT DOCUMENTS

| | | | |
|---|---|---|---|
| 7,054,733 B2 * | 5/2006 | Kubota et al. | 701/96 |
| 7,155,342 B2 * | 12/2006 | Kobayashi et al. | 701/301 |
| 7,292,940 B2 * | 11/2007 | Isogai et al. | 701/301 |
| 7,451,039 B2 * | 11/2008 | Kerner | 701/117 |
| 7,630,819 B2 * | 12/2009 | Sekiguchi | 701/96 |
| 2001/0044692 A1 * | 11/2001 | Isogai et al. | 701/96 |
| 2002/0055813 A1 * | 5/2002 | Adachi et al. | 701/96 |
| 2002/0099491 A1 * | 7/2002 | Akabori et al. | 701/96 |
| 2003/0187578 A1 * | 10/2003 | Nishira et al. | 701/301 |
| 2003/0218564 A1 * | 11/2003 | Tamatsu et al. | 342/70 |
| 2004/0102889 A1 * | 5/2004 | Ibrahim | 701/96 |
| 2004/0195022 A1 * | 10/2004 | Inoue | 180/170 |
| 2004/0236491 A1 * | 11/2004 | Seto | 701/96 |
| 2005/0122251 A1 * | 6/2005 | Shimomura | 342/70 |

\* cited by examiner

VEHICLE DRIVING SUPPORT APPARATUS WITH TARGET POSITION ARRIVAL DETERMINATION

CROSS REFERENCE TO RELATED APPLICATIONS

The disclosure of Japanese Application No. 2005-001844 filed on Jan. 6, 2005 including the specification, drawings and abstract is incorporated herein by reference in its entirety.

BACKGROUND OF THE INVENTION

1. Field of the Invention

This invention relates to a vehicle driving support apparatus mounted on a vehicle, for performing automatic following control for following a leading vehicle ahead of the own vehicle, detected with a stereo camera, a mono camera, or a millimeter wave radar or the like.

2. Description of Related Art

In recent years, travel control systems have been practical used. In these systems have a camera or the like for detecting the travel environment ahead of the vehicle, and for detecting a leading vehicle (front vehicle) based on this travel environment data. According to the detected front vehicle, the systems perform travel control for following the front vehicle and/or keeping the inter-vehicle distance to the front vehicle above a fixed distance.

For example, Japanese unexamined patent publication 5-104977, a vehicle travel control apparatus is disclosed which computes an estimated safe inter-vehicle distance as of after an estimation time elapses, predetermined on the basis of a vehicle speed, a relative speed and an acceleration, or decided using fuzzy logic; computes an estimated inter-vehicle distance as of after the estimation time elapses, on the basis of an inter-vehicle distance and a relative speed; and computes a target vehicle speed on the basis of this estimated inter-vehicle distance and estimated safe inter-vehicle distance.

However, in the above-mentioned patent publication, an estimation time used as an initial reference is just set as a fixed value decided from the weight or natural frequency or engine torque of the own vehicle, or a function of an acceleration and a speed and/or relative speed, and because the present positional relationship with the front vehicle is not taken into account, there is the problem that in some cases the estimation time is set too long and the own vehicle comes too close to the front vehicle, or the estimation time is set too short and smooth control is not possible.

SUMMARY OF THE INVENTION

The present invention was made in view of the situation described above, and it is an object of the invention to provide a vehicle driving support apparatus in which the present positional relationship between the own vehicle and a front vehicle is taken into account and following travel of the own vehicle with respect to the front vehicle is possible without the own vehicle coming too close to the front vehicle and smoothly.

The invention provides a driving support apparatus of an automotive vehicle, including: own vehicle travel information detecting means for detecting travel information of an own vehicle; front vehicle information detecting means for recognizing a front vehicle and detecting information of the front vehicle; control target time setting means for setting a prerequisite inter-vehicle distance to be secured before the front vehicle and setting a time to reaching this requisite inter-vehicle distance as a control target time; front vehicle estimated position computing means for computing an estimated position of the front vehicle as of when the control target time elapses; target acceleration computing means for, on the basis of the present inter-vehicle distance to the front vehicle and the estimated position of the front vehicle as of when the control target time elapses, computing as a target acceleration an acceleration from the present own vehicle speed for a preset target inter-vehicle distance corresponding with the inter-vehicle distance to the front vehicle at the own vehicle speed as of when the control target time elapses; and acceleration/deceleration control means for performing acceleration/deceleration control on the basis of the target acceleration.

With a vehicle driving support apparatus according to the invention, the present positional relationship between the own vehicle and the front vehicle is taken into account and following travel of the own vehicle with respect to a front vehicle is possible without the own vehicle coming too close to the front vehicle and smoothly.

BRIEF DESCRIPTION OF THE DRAWINGS

FIG. 9 is a flow chart of a control routine correspondent to a target acceleration a;

DETAILED DESCRIPTION OF THE PREFERRED EMBODIMENTS

A preferred embodiment of the invention will now be described on the basis of the drawings.

FIG. 1 through FIG. 12 show a preferred embodiment of the present invention.

Figure 1:
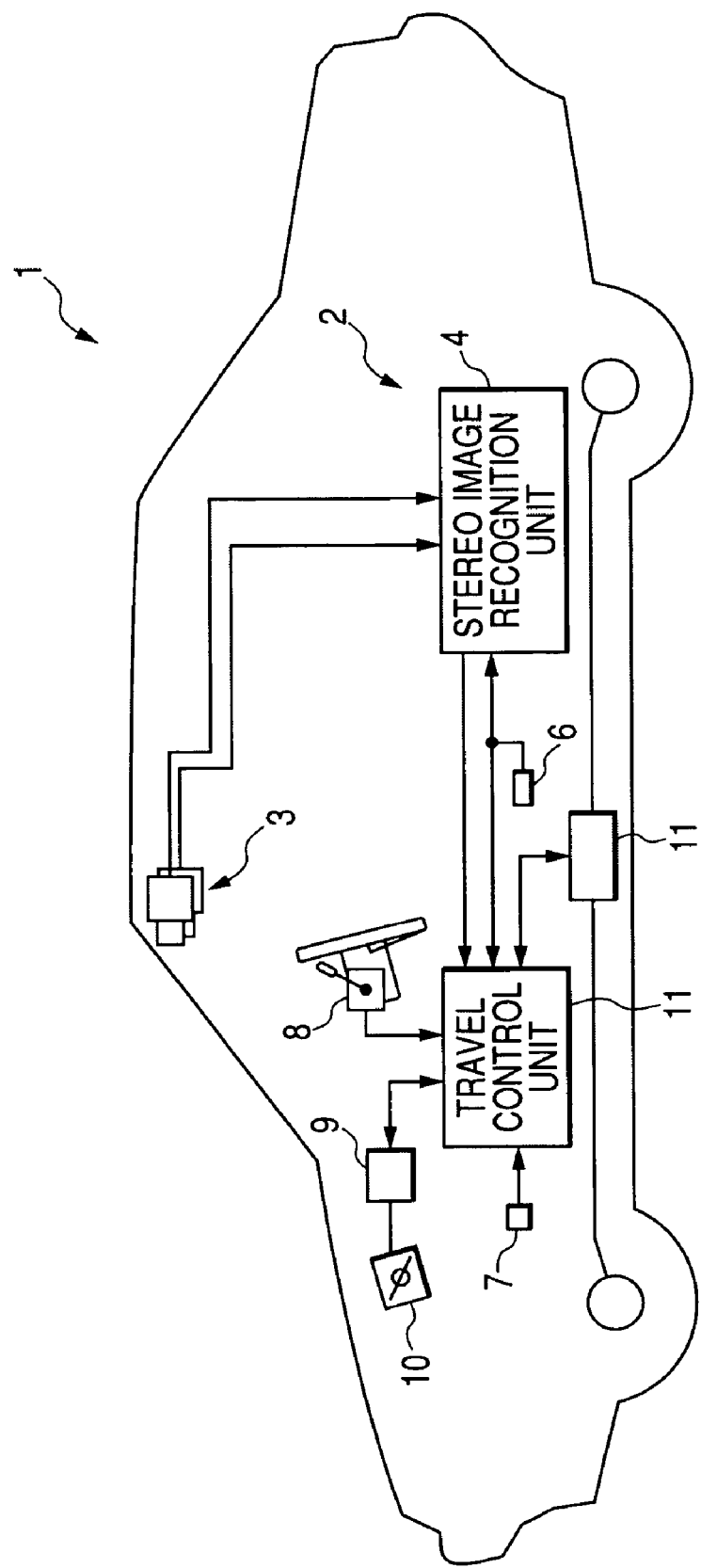
FIG. 1 is a schematic construction view of a vehicle driving support apparatus mounted in a vehicle.

In FIG. 1, the reference number 1 denotes an automotive vehicle such as a car (an own vehicle), and this vehicle 1 is equipped with a cruise control system (ACC (Adaptive Cruise Control) system) 2 serving as an example of a driving support apparatus for an automotive vehicle. This ACC system 2 is made up mainly of a stereo camera 3, a stereo image recognition unit 4 and a travel control unit 5, and with this ACC system 2, basically, in a constant-speed travel control state when there is no front vehicle the own vehicle maintains a vehicle speed set by a driver, and when there is a front vehicle, and particularly when the own vehicle speed V0 is 40 km/h or below, it is controlled by an automatic following control program of FIG. 2 to FIG. 9 discussed hereinafter.

The details will be discussed later, but this automatic following control program presets a prerequisite inter-vehicle distance Dstop before the front vehicle. And the control program sets a time to reaching this requisite inter-vehicle distance Dstop as a control target time t0. And the control program computes an estimated position Lf of the front vehicle as of when the control target time t0 has elapsed. Furthermore, the control program computes as a target acceleration a as an acceleration from a present own vehicle speed V0 that $\bar{a}$ preset target inter-vehicle distance Dtgt corresponding with the inter-vehicle distance to the front vehicle at an own vehicle speed Vtgt as of when the control target time t0 has elapsed, on the basis of the present inter-vehicle distance to the front vehicle L and the estimated position of the front vehicle Lf as of when the control target time t0 has elapsed, and performs automatic braking control (also including following stop control) and automatic acceleration control (also including following start control).

This automatic following control program is executed by the travel control unit 5, and accordingly the travel control unit 5 is constructed to have the functions of control target time setting means, front vehicle estimated position computing means, target acceleration computing means and acceleration/deceleration control means.

The stereo camera 3 is made up of a pair of (left and right) CCD cameras using for example solid-state image pickup devices such as charge-coupled devices (CCD) as a stereo optical system, and these left and right CCD cameras are mounted to the vehicle with a fixed spacing between them and pick up stereo images of objects outside the vehicle from different view points and output them to the stereo image recognition unit 4.

A vehicle speed sensor 6 for detecting the own vehicle speed V0, serving as own vehicle travel information detecting means, is provided on the own vehicle 1, and this own vehicle speed V0 is outputted to the stereo image recognition unit 4 and the travel control unit 5. Also, an ON-OFF signal of a brake pedal from a brake switch 7 of the own vehicle 1 is inputted to the travel control unit 5.

The stereo image recognition unit 4 inputs the images from the stereo camera 3 and the own vehicle speed V0 from the vehicle speed sensor 6, detects information on what is up ahead consisting of data of solid objects and white lines ahead of the own vehicle 1 on the basis of the images from the stereo camera 3, and infers a path (own vehicle path) of the own vehicle 1. And, it extracts a front vehicle ahead of the own vehicle 1 and outputs to the travel control unit 5 various data such as a distance to the front vehicle (inter-vehicle distance) L, a front vehicle speed ((rate of change of the inter-vehicle distance L)+(own vehicle speed V0)) Vf, a front vehicle acceleration (differential value of the front vehicle speed Vf) af, static positions of objects other than the front vehicle, white line coordinates, white line recognition distances, and own vehicle path coordinates.

Here, the processing of images from the stereo camera 3 in the stereo image recognition unit 4 is carried out for example as follows. First, with respect to one pair of stereo images of the environment in the direction of advance of the own vehicle 1 picked up by the CCD cameras of the stereo camera 3, processing for obtaining distance information across the whole image by the triangulation principle from amounts of deviation between corresponding positions is carried out, and a distance image expressing a three-dimensional distance distribution is generated. Then, on the basis of this data, by known grouping processes and comparison with pre-stored three-dimensional road shape data and solid object data and so on, white line data, side wall data of roadside guard rails and curb stones and the like, and solid object data of vehicles and the like are extracted. In solid object data, the distance to a solid object and the change with time of this distance (speed relative to the own vehicle 1) are obtained, and in particular a vehicle that is the closest vehicle in the path of the own vehicle and traveling at a predetermined speed (for example above 0 km/h) in substantially the same direction as the own vehicle 1 is extracted as a front vehicle. A vehicle among front vehicles that has a speed Vf of about 0 km/h is recognized as a stopped front vehicle. In this way, the stereo camera 3 and the stereo image recognition unit 4 are provided as front vehicle information detecting means.

The travel control unit 5 is for realizing a cruise control function for performing cruise control so as to maintain a travel speed set by a control input of the driver and the automatic following control function shown in FIG. 2 to FIG. 9 discussed below, and connected to it are a cruise switch 8 made up of a plurality of switches linked to a cruise control lever provided for example on the side of a steering column, the stereo image recognition unit 4, the vehicle speed sensor 6 and the brake switch 7.

The cruise switch 8 is made up of a speed setting switch for setting a target speed for cruising, a coast switch mainly for altering the setting of the target speed downward, and a resume switch mainly for altering the setting of the target speed upward. Also, a main switch (not shown) for turning ON/OFF the cruise control and automatic following control is disposed in the vicinity of this cruise control lever.

When the driver turns ON the main switch (not shown) and sets a desired speed by means of the cruise control lever, a signal from the cruise switch 8 is inputted to the travel control unit 5. Then, the travel control unit 5 outputs a signal to a throttle valve control device 9 to feedback control the aperture of a throttle valve 10 so that the vehicle speed detected by the vehicle speed sensor 6 approaches the set speed set by the driver, whereby the own vehicle 1 is automatically made to travel at a constant speed, or it outputs a deceleration signal to an automatic brake control device 11 and thereby causes automatic braking to operate.

And, during cruise control, when the stereo image recognition unit 4 has recognized a front vehicle, under predetermined conditions the travel control unit 5 automatically switches to automatic following control, which will be further discussed later. The cruise control function and the automatic following control function are discontinued in cases such as when the driver depresses a brake pedal, when the own vehicle speed V0 exceeds a preset upper limit value, and when the main switch is turned OFF.

Figure 2:
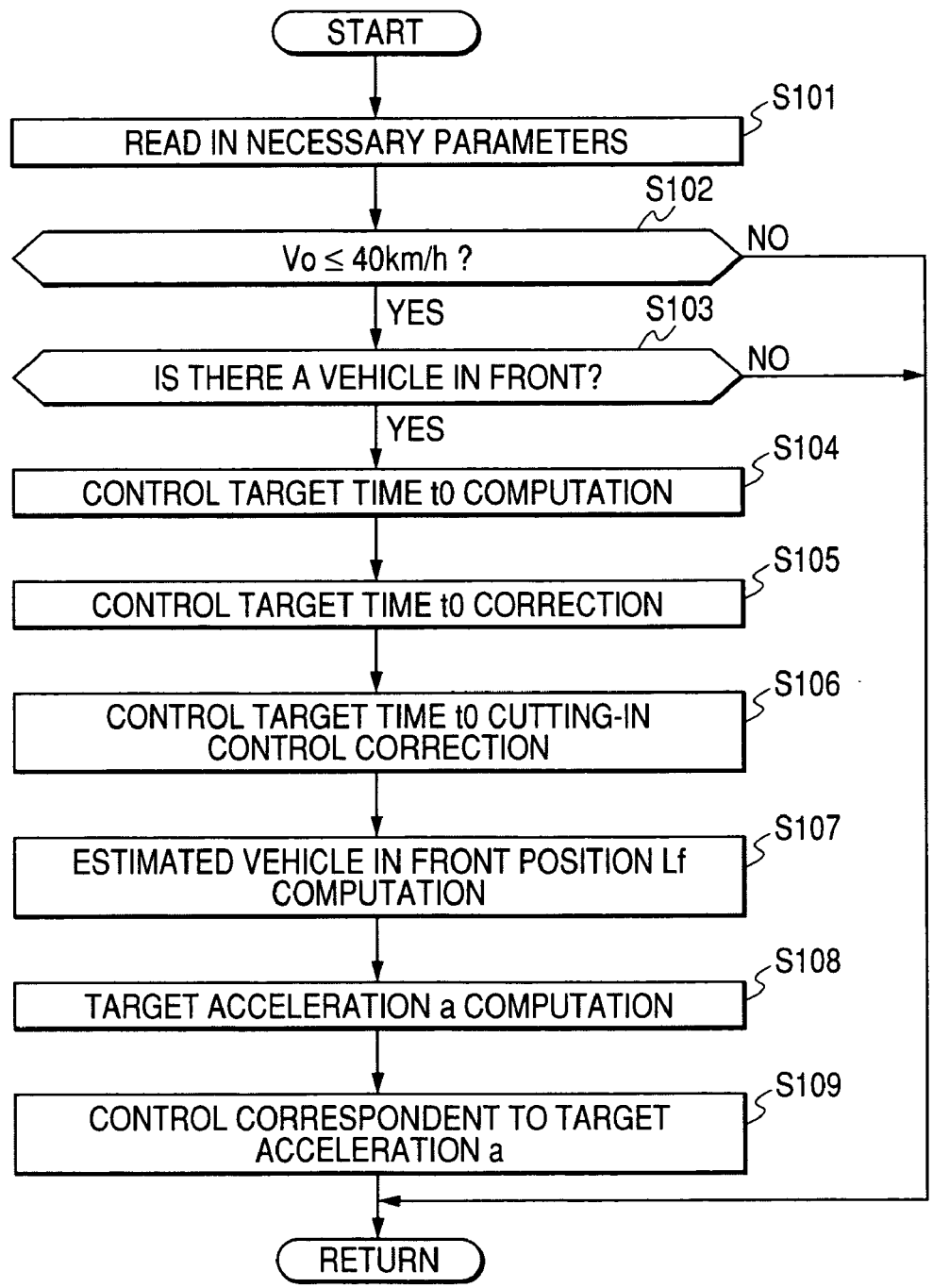
FIG. 2 is a flow chart of an automatic following control program.
Figure 3:
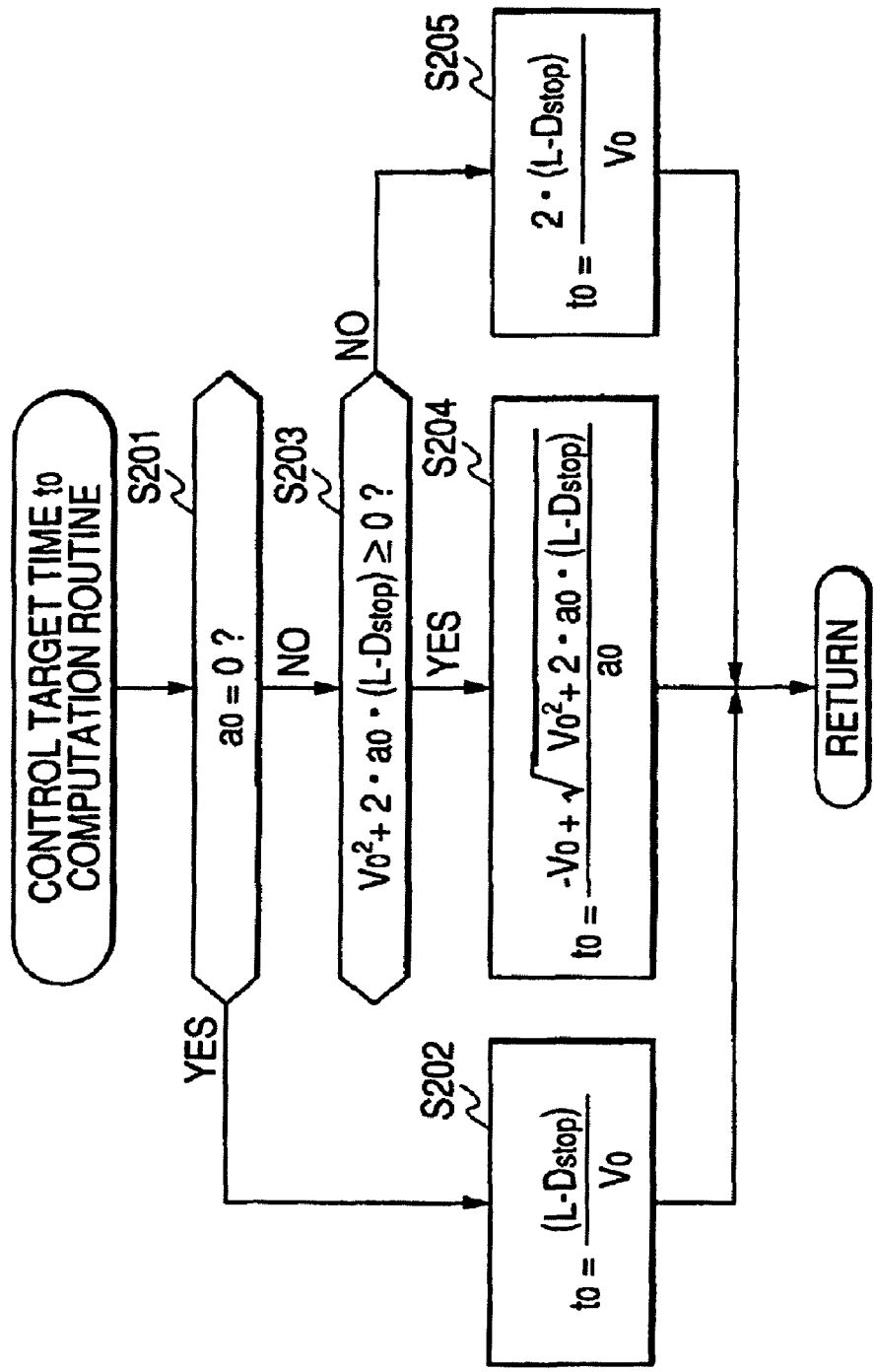
FIG. 3 is a flow chart of a control target time t0 computation routine.
Figure 4:
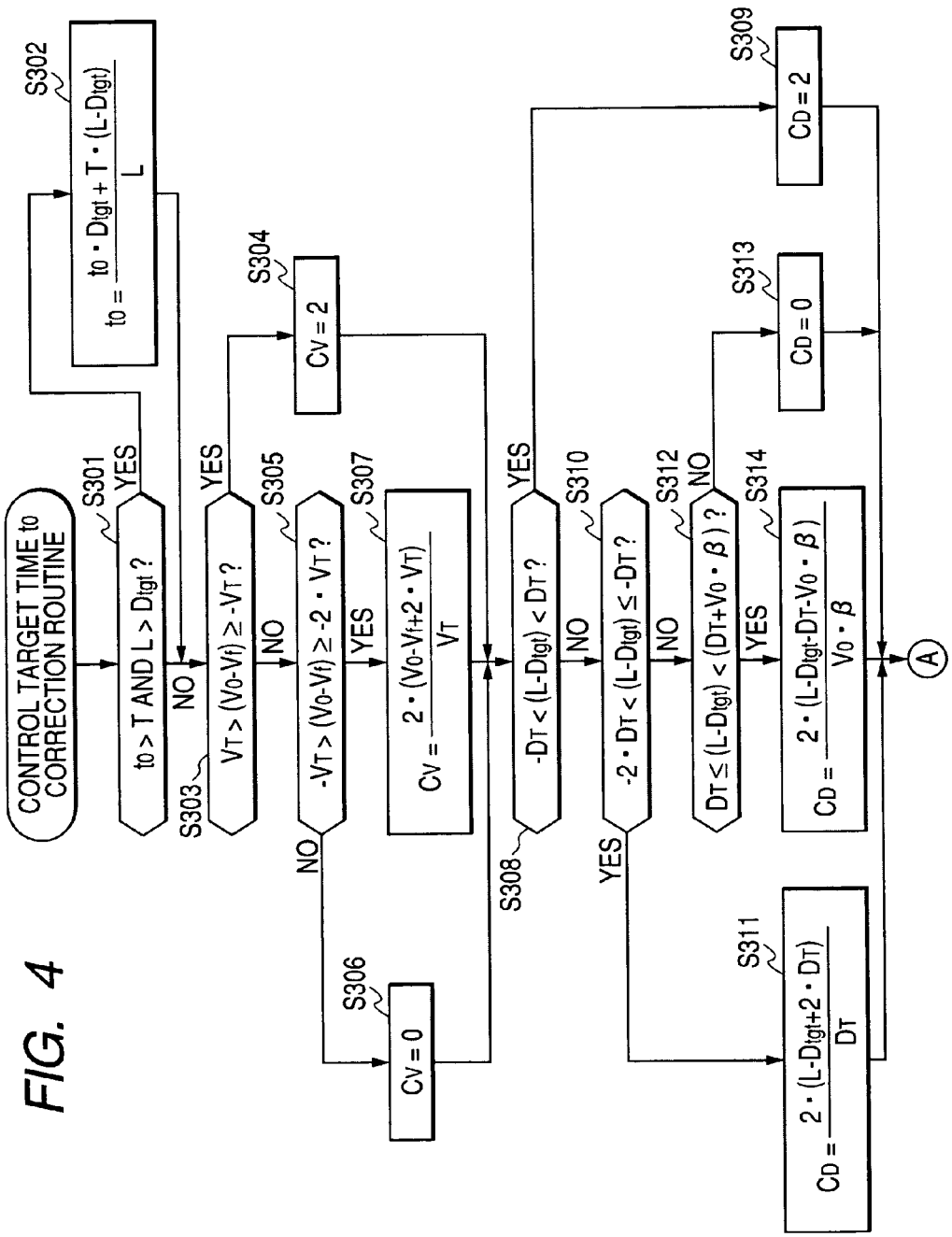
FIG. 4 is a flow chart of a control target time t0 correction routine.
Figure 5:
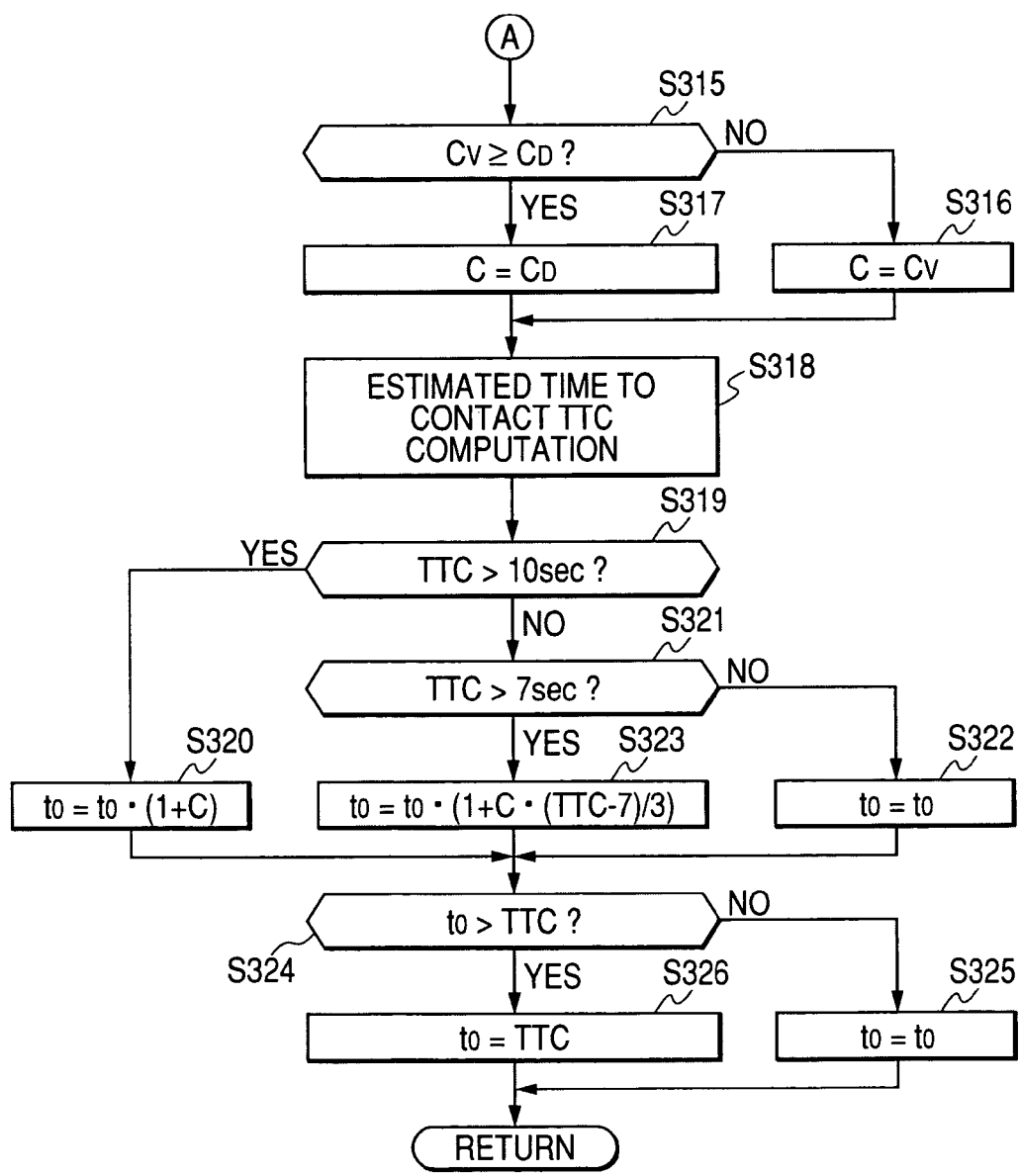
FIG. 5 is a flow chart continuing from FIG. 4.

That is, as shown in FIG. 2, the automatic following control program in the travel control unit 5, first, in a step (hereinafter abbreviated to 'S') 101, performs reading in of necessary parameters. And then proceeds to S102 and carries out a determination of whether or not the own vehicle speed V0 is below 40 km/h. And when the own vehicle speed V0 is below 40 km/h proceeds to S103 and carries out a determination of whether or not there is a front vehicle, and when there is a front vehicle proceeds to the processing of S104 onward. That is, proceeds to automatic following control processing.

And when it is determined in S103 that the own vehicle speed V0 exceeds 40 km/h, or when it is determined in S104 that there is no front vehicle, the rest of the program is skipped and, even though the main switch is ON, automatic following control for following a front vehicle is not executed.

Figure 10:
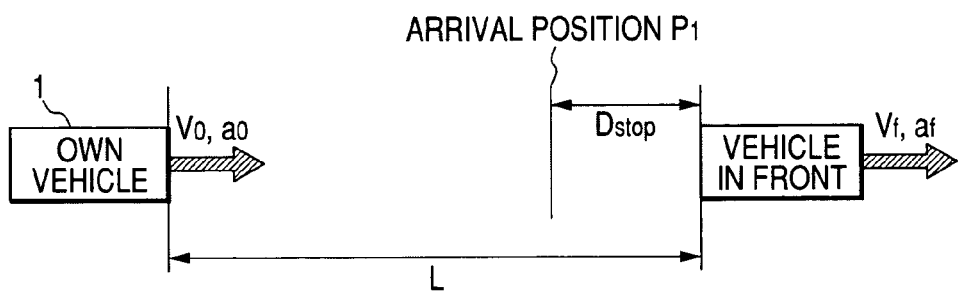
FIG. 10 is a view illustrating an inter-vehicle distance to a front vehicle and a requisite inter-vehicle distance before the front vehicle.

When in S103 it is determined that there is a front vehicle and processing proceeds to S104, computation of a control target time t0 is carried out. In this computation a control target time t0 is set in accordance with a control target time t0 computation routine shown in FIG. 3, and variables relating to the setting of this control target time t0 are illustrated in FIG. 10.

First, in S201, it is determined whether or not the acceleration a0 of the own vehicle 1 (the differential value of the own vehicle speed V0, or the sensor value from an acceleration sensor (not shown)) is 0 km/h$^2$, and when the acceleration a0 is 0 km/h$^2$, processing proceeds to S202 and uses the following expression (1) to set a control target time t0 as a time until the own vehicle 1 arrives at a prerequisite inter-vehicle distance before the front vehicle Dstop (arrival position P1=L-Dstop in FIG. 10), and the routine ends.

$$t0=(L-Dstop)/V0 \quad (1)$$

When the result of the determination of S201 is that the acceleration a0 is not 0 km/h$^2$, processing proceeds to S203 and determines, on the basis of whether or not the following expression (2) is satisfied, whether or not given its present speed V0 and acceleration a0 the own vehicle 1 can reach the arrival position P1.

$$V0^2+2 \cdot a0 \cdot (L-Dstop) \geqq 0 \quad (2)$$

When it is determined that this expression (2) is satisfied and therefore given its present speed V0 and acceleration a0 the own vehicle 1 can reach the arrival position P1, processing proceeds to S204 and on the basis of the following expression (3) sets the control target time t0 as the time until the own vehicle 1 with its present speed V0 and acceleration a0 reaches the arrival position P1, and the routine returns.

$$t0=(-V0+(V0^2+2 \cdot a0 \cdot (L-Dstop))^{1/2})/a0 \quad (3)$$

And when as the result of the determination of S203 it is determined that given its present speed V0 and acceleration a0 the own vehicle 1 cannot reach the arrival position P1, processing proceeds to S205 and supposes that the own vehicle speed V0 will become 0 (stop) at the arrival position P1 and sets the control target time t0 as the corresponding time to reaching this arrival position P1, on the basis of the following expression (4), after which the routine returns.

$$t0=2 \cdot (L-Dstop)/V0 \quad (4)$$

After a control target time t0 has been computed in S104 of FIG. 2 (the control target time t0 computation routine shown in FIG. 3), processing proceeds to S105 and performs correction of the control target time t0. This correction of the control target time t0 is carried out in accordance with a control target time t0 correction routine shown in FIG. 4 and FIG. 5.

First, in S301, it is determined whether or not the control target time t0 is greater than an inter-vehicle time T and furthermore the present inter-vehicle distance L is greater than a target inter-vehicle distance Dtgt. Here, the inter-vehicle time T is the value obtained by dividing the inter-vehicle distance L by the own vehicle speed V0, or is a preset value (for example 1.6 seconds).

And the target inter-vehicle distance Dtgt is a value calculated using the own vehicle speed V0 by means of the following expression (5).

$$Dtgt=T \cdot V0+Dstop \quad (5)$$

Then, because when the condition of S301, i.e. that t0>T and L>Dtgt, is satisfied there are cases where the greater than the target inter-vehicle distance Dtgt the inter-vehicle distance L is the smaller the target acceleration a becomes, processing proceeds to S302 and corrects the control target time t0 with the inter-vehicle time T and the inter-vehicle distance L and the target inter-vehicle distance Dtgt on the basis of the following expression (6) so that the greater the inter-vehicle distance L is the greater a target acceleration a becomes. This expression (6) is an expression determined by experiment.

$$t0=(t0 \cdot Dtgt+T \cdot (L-Dtgt))/L \quad (6)$$

And, when the result of the determination of S301 is that t0>T and L>Dtgt is not satisfied, processing proceeds to S303. In S303, it is determined whether or not the absolute value of the speed relative to the front vehicle is smaller than a preset threshold value VT (a positive value), that is, whether or not VT>(V0−Vf)≧−VT is satisfied and thus the absolute value of the speed relative to the front vehicle is small.

When as the result of the determination of S303 it is determined that VT>(V0−Vf)≧−VT is satisfied and thus the absolute value of the speed relative to the front vehicle is small, to prevent an unnecessary deceleration occurring and the driver being given an unnatural feeling, processing proceeds to S304 and sets a speed control target time correction value Cv to 2, and then proceeds to S308. This speed control target time correction value Cv is a value by which the control target time t0 will be multiplied: the greater it is the greater it makes the control target time t0, and it acts to moderate change of the target acceleration a. A correction computation using this speed control target time correction value Cv will be discussed later.

And when the result of the determination of S303 is that VT>(V0−Vf)≧−VT is not satisfied, processing proceeds to S305 and determines whether or not −VT>(V0−Vf)≧−2·VT is satisfied.

When the result of the determination of S305 is that −VT>(V0−Vf)≧2·VT does not hold, processing proceeds to S306 and sets the speed control target time correction value Cv to 0 (no correction), and then proceeds to S308.

When the result of the determination of S305 is that −VT>(V0−Vf)≧−2·VT is satisfied, processing proceeds to S307 and sets the speed control target time correction value Cv on the basis of the following expression (7) so that between −VT and −2·VT the speed control target time correction value Cv varies linearly from 0 to 2, and then proceeds to S308.

$$Cv=2 \cdot (V0-Vf+2 \cdot VT)/VT \quad (7)$$

When a speed control target time correction value Cv has been set by one of S304, S306 and S307 and processing proceeds to S308, it is determined whether or not the absolute value of the difference between the present inter-vehicle distance D to the front vehicle and the target inter-vehicle distance Dtgt is smaller than a preset threshold value DT (a positive value), that is, whether or not −DT<(L−Dtgt)<DT holds and thus the absolute value of the difference between the present inter-vehicle distance D to the front vehicle and the target inter-vehicle distance Dtgt is small.

When as the result of the determination of S308 it is determined that −DT<(L−Dtgt)<DT holds and thus the absolute value of the difference between the present inter-vehicle distance D to the front vehicle and the target inter-vehicle distance Dtgt is small, to prevent an unnecessary deceleration occurring and the driver being given an unnatural feeling, processing proceeds to S309 and sets a distance target time correction value CD to 2, and then proceeds to S315. This distance target time correction value CD is a value by which the control target time t0 will be multiplied: the greater it is the greater it makes the control target time t0, and it acts to moderate change in the target acceleration a. A correction computation using this distance target time correction value CD will be discussed later.

When the result of the determination of S308 is that −DT<(L−Dtgt)<DT is not satisfied, processing proceeds to S310 and determines whether or not −2·DT<(L−Dtgt)≦−DT holds.

When the result of the determination of S310 is that −2·DT(L−Dtgt)≦−DT holds, processing proceeds to S311 and sets the distance target time correction value CD on the basis of the following expression (8) so that between −2·DT and −DT the distance target time correction value CD varies linearly from 0 to 2, and then proceeds to S315.

$$CD=2\cdot(L-Dtgt+2\cdot DT)/DT \quad (8)$$

And when the result of the determination of S310 is that −2·DT<(L−Dtgt)≦−DT does not hold, processing proceeds to S312 and determines whether or not DT≦(L−Dtgt)<(DT+V0·β) is satisfied. Here, β is a fixed value, and the determination is made to vary in accordance with the size of the own vehicle speed V0 to make a more precise control determination possible. Thus the determinations of S303, S305, S308, S310 and S312 each show but one example of the respective determination, and according to the case they may alternatively be made to vary taking into account a parameter such as the own vehicle speed V0.

When the result of the determination of S312 is that DT≦(L−Dtgt)<(DT+V0·β) is not satisfied, processing proceeds to S313 and sets the distance target time correction value CD to 0 (no correction), and then proceeds to S315.

Conversely, when the result of the determination of S312 is that DT≦(L−Dtgt)<(DT+V0·β) is satisfied, processing proceeds to S314 and sets the distance target time correction value CD on the basis of the following expression (9) so that between DT and (DT+V0·β) the distance target time correction value CD varies linearly from 0 to 2, and then proceeds to S315.

$$CD=2\cdot(L-Dtgt-DT-V0\cdot\beta)/(V0\cdot\beta) \quad (9)$$

When the distance target time correction value CD has been set by any of S309, S311, S313 and S314 and processing proceeds to S315, a comparison of the speed control target time correction value Cv and the distance target time correction value CD is carried out, and if Cv<CD processing proceeds to S316 and sets the speed control target time correction value Cv as a target time correction value C, and if Cv≧CD processing proceeds to S317 and sets the distance target time correction value CD as the target time correction value C, and proceeds to S318. That is, this S315 is processing to set the smaller of the correction values as a target time correction value C, whereby the correction of the control target time t0 is made as small as possible and as far as possible the computed control target time t0 is used.

When processing proceeds to S318, for example by expression (10) or expression (11) below, computation of an estimated time TTC to contact with the front vehicle is carried out.

When the own vehicle acceleration a0 is 0 and the front vehicle acceleration af is considered, the estimated time to contact TTC is as follows.

$$TTC=((V0-Vf)-((V0-Vf)^2-2\cdot af\cdot L)^{1/2})/af \quad (10)$$

And when at the time of contact the front vehicle is stopped, $$TTC=(L-(Vf^2/(2\cdot af)))/V0 \quad (11)$$

After that, processing proceeds to S319 and determines whether or not there is a surplus in the estimated time to contact TTC: for example, it determines whether or not it is longer than 10 seconds, and if it is longer than 10 seconds, processing proceeds to S320 and on the basis of the following expression (12) corrects the control target time t0 using the target time correction value C set in S316 or S317, and then proceeds to S324.

$$t0=t0\cdot(1+C) \quad (12)$$

When as result of the determination of S319 it is determined that TTC≦10 secs and it cannot be said that there is a surplus, processing proceeds to S321 and determines whether or not the estimated time to contact TTC has nil surplus. For example, in this preferred embodiment, at 7 seconds or below it is determined that there is nil surplus, and when as the result of the determination of S321 it is determined that TTC≦7 sec and there is nil surplus, processing proceeds to S322 and correction with the target time correction value C is not carried out, that is, t0=t0 is set and processing proceeds to S324.

When in S321 it is determined that TTC>7 sec and there is not nil surplus, processing proceeds to S323 and for example by the following expression (13) the control target time t0 is corrected using the target time correction value C set in S316 or S317, after which processing proceeds to S324.

$$t0=t0\cdot(1+C\cdot(TTC-7)/3) \quad (13)$$

That is, the processing of S318 to S323 described above is processing that varies the target time correction value C in correspondence with the estimated time to contact TTC, giving priority to safety over comfort when the estimated time to contact TTC is small. By this means, an optimal balance between comfort and safety can be obtained.

When the control target time t0 has been corrected by one of S320, S322 and S323 and processing proceeds to S324, a comparison of the control target time t0 and the estimated time to contact TCC is carried out, and when t0≦TTC processing proceeds to S325 and sets the control target time t0 without correction and the routine returns. Conversely, when t0>TTC, processing proceeds to S326 and the control target time t0 is limited to the estimated time to contact TTC before the routine returns. And, by this limitation, the possibility of contact is eliminated without fail.

After the control target time t0 is corrected in S105 of FIG. 2 (the control target time t0 correction routine shown in FIG. 4 and FIG. 5) like this, processing proceeds to S106 and performs cutting-in control correction of the control target time t0. Here, cutting-in refers to another vehicle cutting-in in front of the own vehicle, for example from an adjacent traffic lane. This cutting-in control correction of the control target time t0 is carried out in accordance with a control target time t0 cutting-in control correction routine shown in FIG. 6.

First, in S401, an estimated time to contact TTC is computed on the basis of expression (10) or expression (11) above.

After that, processing proceeds to S402, and determines whether or not the inter-vehicle distance L is equal to or greater than the target inter-vehicle distance Dtgt, and when the inter-vehicle distance L is smaller than the target inter-vehicle distance Dtgt processing proceeds to S403 and determines whether or not the front vehicle acceleration af is a deceleration of −0.1·G or below and furthermore the own vehicle speed V0 is greater than the front vehicle speed Vf, and when this condition is satisfied a cutting-in state is inferred and processing proceeds to S404.

Conversely, when in S402 the inter-vehicle distance L is equal to or greater than the target inter-vehicle distance Dtgt or the condition in S403 is not satisfied, a cutting-in state is not inferred and processing proceeds to S407 and sets the control target time t0 unchanged to t0 and skips the rest of the routine.

When it is determined that L<Dtgt in S402 and the condition of S403 is satisfied and processing proceeds to S404, it is determined whether or not there is a surplus in the estimated time to contact TTC: for example it is determined whether or not it is longer than 10 seconds, and when it is longer than 10 seconds processing proceeds to S405 and corrects the control target time t0 using a cutting-in control correction value Cin (a constant preset by experiment or the like; for example 5) on the basis of the following expression (14), and skips the rest of the routine.

$$t0=t0\cdot(1+Cin) \quad (14)$$

And when as the result of the determination of S404 it is determined that TTC≦10 sec and it cannot be said that there is a surplus, processing proceeds to S406 and determines whether or not there is nil surplus in the estimated time to contact TTC. For example, in this preferred embodiment, at 2 seconds or below it is determined that there is nil surplus, and when as the result of the determination of S406 it is determined that TTC≦2 sec and there is nil surplus, processing proceeds to S407 and correction of the control target time t0 is not carried out, that is, t0=t0 is set, and the rest of the routine is skipped.

And when in S406 it is determined that TTC>2 sec and there is not nil surplus, processing proceeds to S408 and for example on the basis of the following expression (15) the control target time t0 is corrected using the cutting-in control correction value Cin, and the routine returns.

$$t0=t0\cdot(1+Cin\cdot(TTC-2)/8) \quad (15)$$

That is, this control target time t0 cutting-in control correction corrects the control target time t0 greatly in correspondence with the estimated time to contact TTC so that an unnecessary sharp braking/deceleration does not occur on when another vehicle 'cuts in' in front of the own vehicle.

Figure 6:
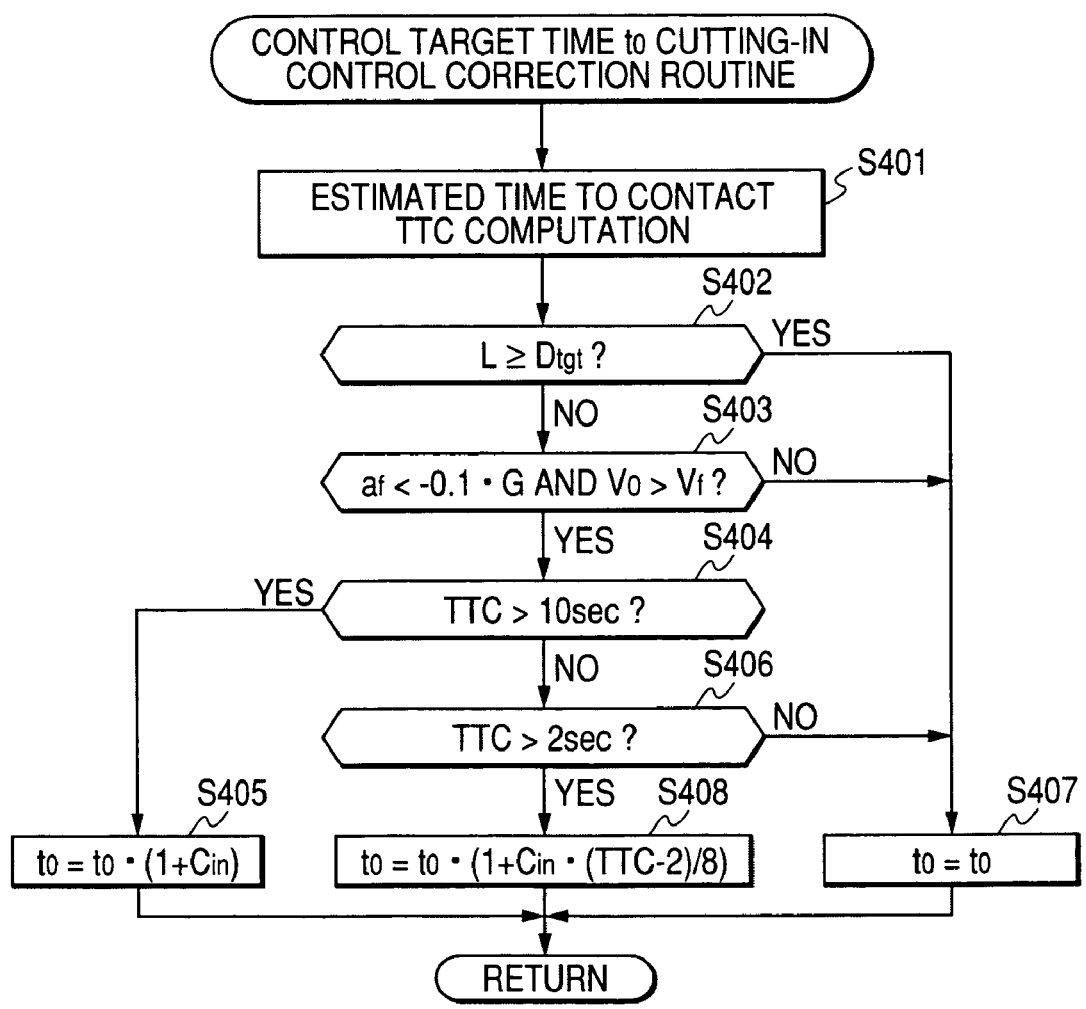
FIG. 6 is a flow chart of a control target time t0 cutting-in control correction routine.
Figure 11:
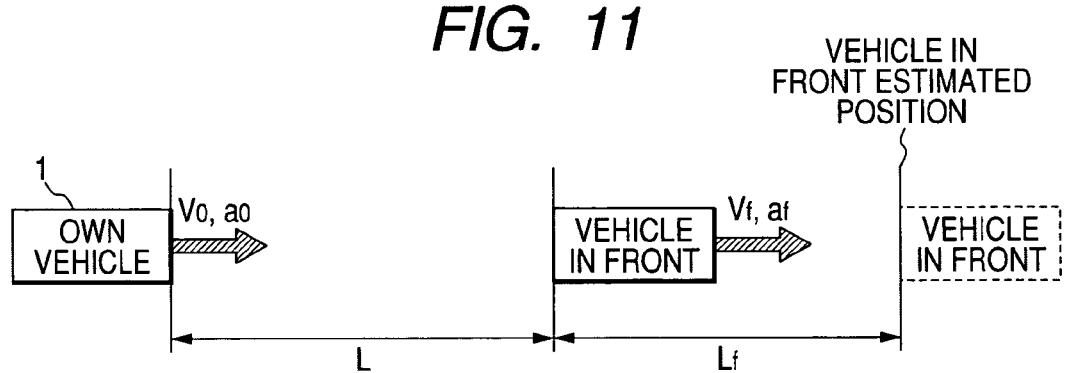
FIG. 11 is a view illustrating an estimated position of a front vehicle.

After the control target time t0 is corrected in S106 of FIG. 2 (the control target time t0 cutting-in control correction routine shown in FIG. 6) like this, processing proceeds to S107 and performs computation of an estimated front vehicle position Lf. This front vehicle estimated position Lf computation is carried out in accordance with a the front vehicle estimated position Lf computation routine shown in FIG. 7, and variables relating to the computation of this front vehicle estimated position Lf are shown in FIG. 11.

First, in S501 it is determined whether or not the front vehicle is stopped, that is, whether or not Vf=0, and when Vf=0, processing proceeds to S502 and sets Lf=0 and skips the rest of the routine.

When the result of the determination of S501 is that Vf≠0, processing proceeds to S503 and determines whether or not the front vehicle will be stopped at the control target time t0, that is, whether or not af≠0 and furthermore t0≦−Vf/af holds.

When the result of the determination of S503 is that the front vehicle will be stopped at the control target time t0, processing proceeds to S504 and sets the front vehicle estimated position Lf by means of the following expression (16), and the routine returns.

$$Lf=-Vf^2/(2\cdot af) \quad (16)$$

And when the result of the determination of S503 is that at the control target time t0 the front vehicle will not be stopped, processing proceeds to S505 and sets the front vehicle estimated position Lf by means of the following expression (17), and the routine returns.

$$Lf=Vf\cdot t0+(\tfrac{1}{2})\cdot af\cdot t0^2 \quad (17)$$

Figure 7:
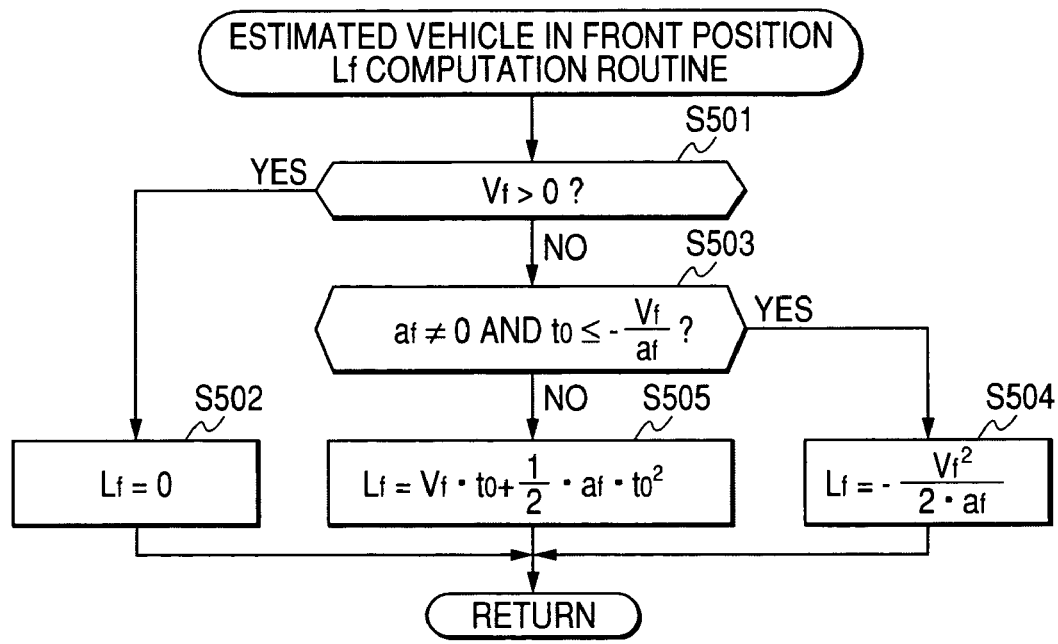
FIG. 7 is a flow chart of an estimated front vehicle position Lf computation routine.
Figure 8:
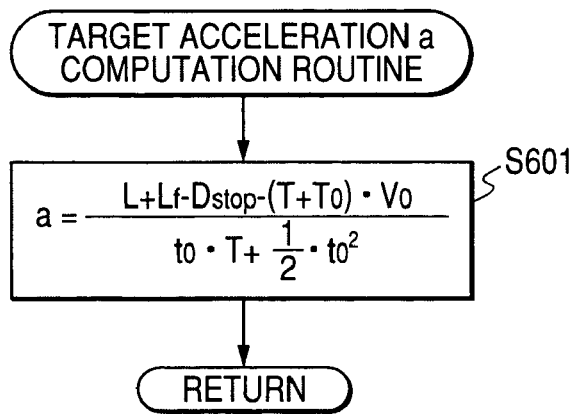
FIG. 8 is a flow chart of a target acceleration $\underline{a}$ computation routine.
Figure 9:
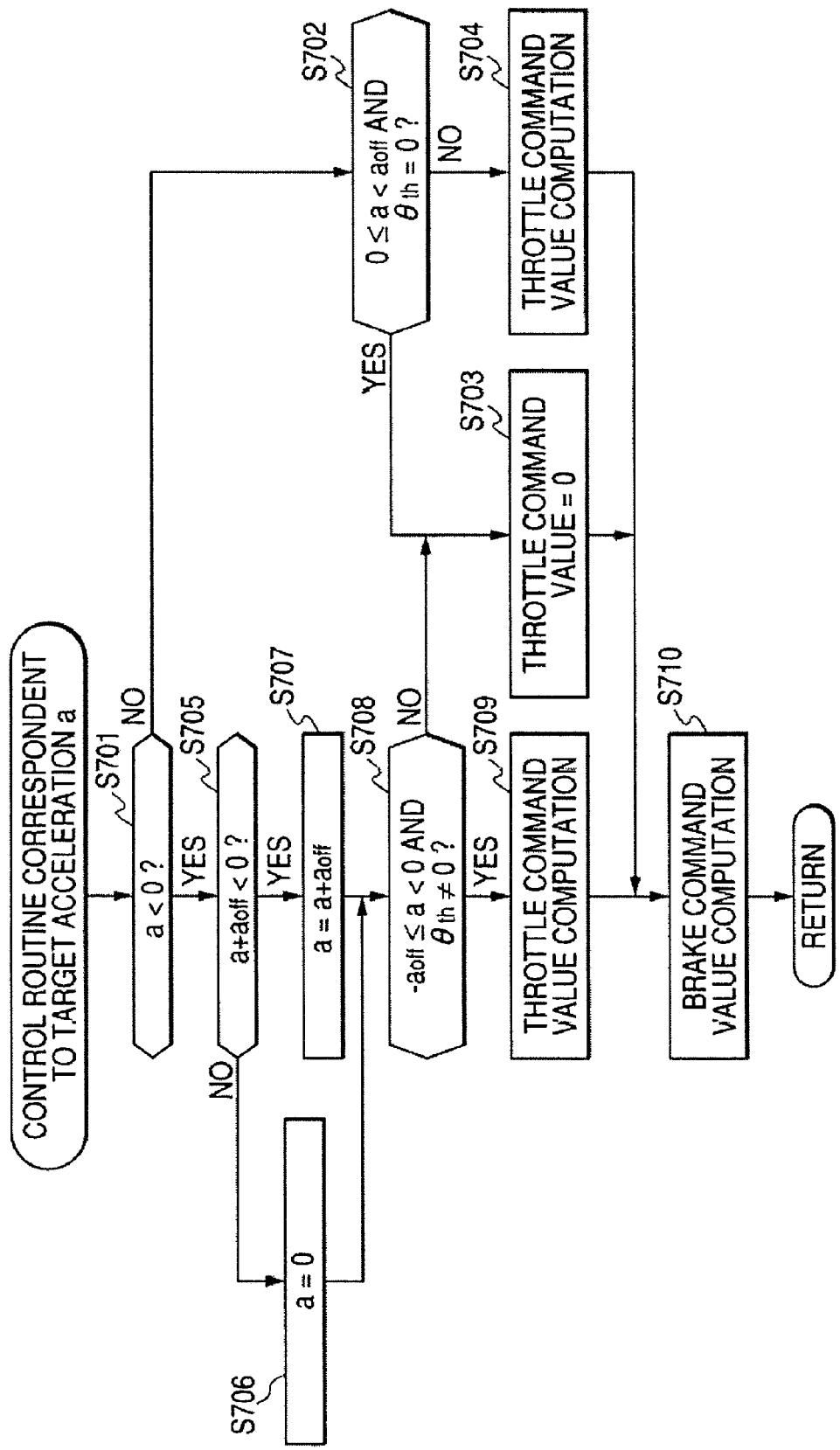

After the front vehicle estimated position Lf is computed in S107 of FIG. 2 (the front vehicle estimated position Lf computation routine shown in FIG. 7), processing proceeds to S108 and performs computation of a target acceleration a. The computation of this target acceleration a is carried out in accordance with a target acceleration a computation routine shown in FIG. 8.

That is, in S601, a target acceleration a is computed using the following expression (18), and the routine returns.

$$a=(L+Lf-Dstop-(T+t0)\cdot V0)/(t0\cdot T+(\tfrac{1}{2})\cdot t0^2) \quad (18)$$

Figure 12:
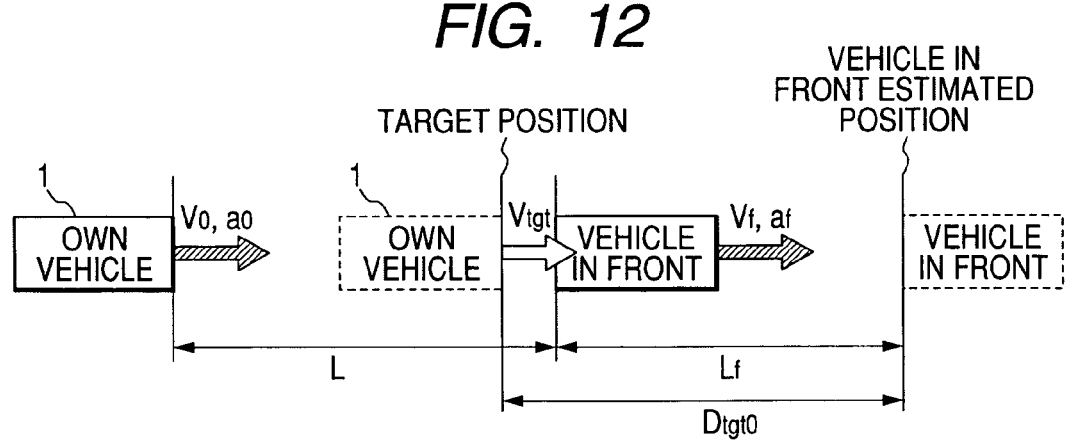
FIG. 12 is a view illustrating a target inter-vehicle distance as of when a control target time has elapsed.

This expression (18) is derived from the own vehicle speed Vtgt as of when t0 elapses and the target inter-vehicle distance Dtgt0 as of when t0 elapses, and because the optimum movement distance relationship as of when t0 elapses is, as is clear also from FIG. 12, $$L+Lf-(T\cdot Vtgt+Dstop)=t0\cdot V0+(\tfrac{1}{2})\cdot a\cdot t0^2 \quad (19)$$

it is the expression obtained by rewriting this for the target acceleration a.

Here, the own vehicle speed Vtgt as of when t0 elapses is computed using the target acceleration a by means of the following expression (20).

$$Vtgt=V0+a\cdot t0 \quad (20)$$

And the target inter-vehicle distance Dtgt0 of when t0 elapses is a value computed using the own vehicle speed Vtgt as of when t0 elapses by means of the following expression (21).

$$Dtgt0=T\cdot Vtgt+Dstop \quad (21)$$

After the target acceleration a is computed in S108 of FIG. 2 (the target acceleration a computation routine shown in FIG. 8), processing proceeds to S109 and performs control correspondent to the target acceleration a, after which the program returns. This control correspondent to the target acceleration a is carried out in accordance with a control routine correspondent to the target acceleration a shown in FIG. 9.

First, in S701 it is determined whether or not the target acceleration a is smaller than 0, and when the target acceleration a is 0 or greater processing proceeds to S702 and determines whether or not the target acceleration a is an acceleration smaller than aoff (a preset positive value) and furthermore a throttle angle θth=0.

When the result of the determination of this S702 is that the target acceleration a is an acceleration smaller than aoff and the throttle angle θth=0, to prevent the throttle valve 10 from being opened unnecessarily and the driver being subjected to an unpleasant vibration, a throttle command value for the throttle valve control device 9 is set to 0 and processing proceeds to a brake command value computation of the following S710.

And when the result of the determination of S702 is that the target acceleration a is equal to or greater than aoff, and/or the throttle aperture is already not 0, processing proceeds to S704 and sets a throttle command value corresponding to that target acceleration a for example by referring to a map or the like before proceeding to the brake command value computation of the following S710.

On the other hand, when in S701 above it is determined that the target acceleration a is smaller than 0, processing proceeds to S705 and determines whether the acceleration value (a+aoff), obtained by adding to that target acceleration a the acceleration value aoff that would presumably be obtained when the throttle angle θth is 0, is less than 0.

When the result of this determination of S705 is that (a+aoff) is equal to or greater than 0 and the initial target acceleration a is a very small deceleration, processing proceeds to S706 and sets the target acceleration $\underline{a}$ to 0 before proceeding to S708.

Conversely, when (a+aoff) is smaller than 0, the target acceleration $\underline{a}$ is made (a+aoff) and thus set to a value taking into account the acceleration value aoff that would presumably be obtained when the throttle angle is 0, and processing proceeds to S708.

When processing proceeds from S706 or S707 to S708, it is determined whether or not −aoff≦a<0 and furthermore the throttle angle θth≠0 is satisfied, and when already the throttle angle θth=0 or a is a deceleration such that a<−aoff, processing proceeds to S703 and sets the throttle command value for the throttle valve control device 9 to 0 and moves to the brake command value computation processing of the following S710.

And when the result of the determination of S708 is that −aoff≦a<0 and furthermore the throttle angle θth≠0 is satisfied, then directly a throttle command value corresponding to the target acceleration $\underline{a}$ is set, for example by referring to a map, and processing moves to the brake command value computation processing of the following S710.

When processing proceeds from one of S703, S704 and S709 to S710, when the target acceleration necessitates a deceleration larger than a predetermined value, a brake fluid pressure signal corresponding to that value is set as a brake command value for the automatic brake control device 11 by referring to a map or the like, and the routine returns. In S710, when the throttle command value is not 0, the brake command value becomes 0.

In this way, with the control routine correspondent to the target acceleration a of this preferred embodiment, when the target acceleration is around 0, because the throttle valve 10 is prevented from being controlled continuously from fully closed→a fixed aperture→fully closed or the like in a short space of time, the driver is not subjected to an unnatural feeling, and smooth control is possible.

Thus, with this invention, because the control target time t0 is set taking into account the present positional relationship between the front vehicle and the own vehicle, and following control based on this control target time t0 is possible, travel following a front vehicle of the own vehicle can be carried out without coming too close to the front vehicle and smoothly.

And, because a prerequisite inter-vehicle distance Dstop before the front vehicle is set and the control target time t0 is set with the time to reaching this requisite inter-vehicle distance Dstop as a reference, an inter-vehicle distance with respect to the front vehicle is secured without fail and control with improved safety becomes possible.

Also, because the control target time t0 is corrected taking into account a balance between ride comfort and safety, and so that even in the case of cutting-in occurring any acceleration or deceleration is kept moderate, it is possible to realize a natural and highly safe system.

The target time correction value C for correcting the control target time t0 may be greatly changed (corrected) in correspondence with the set inter-vehicle distance, specifically as the set inter-vehicle distance shortens. For example, it may be made the value given by the following expression (22), $$C = C\min + (T\max - X), \quad (22)$$

in which X is a target inter-vehicle time and Cmin is a constant obtained by experiment or the like, and Tmax is the target inter-vehicle time of when at the own speed V0 the set inter-vehicle distance Dtgt is made a maximum (the inter-vehicle distance that can be set in following control). Because by this means the control target time t0 can be set to a large value, it is possible to moderate change of the target acceleration and prevent an unnecessary acceleration or deceleration occurring and the driver being subjected to an unnatural feeling.

Also, in the execution of following control, operation of the throttle valve 10 and operation of the brake frequently being carried out alternately is also prevented, and the system provides excellent ride comfort.

Although in this preferred embodiment recognition of the front vehicle was carried out using a stereo camera, recognition may alternatively be carried out using other technology, for example information from a millimeter wave radar or a mono camera.

What is claimed is:

1. A vehicle driving support apparatus, comprising:
   own vehicle travel information detecting means for detecting travel information of an own vehicle;
   front vehicle information detecting means for recognizing a vehicle in front of the own vehicle and detecting information of the front vehicle;
   control target time setting means for setting a time required to reach a target position (P1) set before the front vehicle as a control target time;
   front vehicle estimated position computing means for computing an estimated position of the front vehicle as of when the control target time elapses;
   target acceleration computing means for computing a target acceleration of the own vehicle on the basis of the estimated position of the front vehicle and a target inter-vehicle distance such that an inter-vehicle distance between the own vehicle and the front vehicle matches the target inter-vehicle distance when the control target time elapses; and
   acceleration/deceleration control means for performing acceleration/deceleration control on the basis of the target acceleration
   wherein the target inter-vehicle distance is computed based on the control target time and a speed of the own vehicle.

2. The vehicle driving support apparatus according to claim 1, wherein the control target time is computed from a present own vehicle speed, a present own vehicle acceleration, a present inter-vehicle distance to the front vehicle, and a requisite inter-vehicle distance.

3. The vehicle driving support apparatus according to claim 1, wherein when the present own vehicle acceleration is zero, the control target time is set as the time to reach the target position at the present own vehicle speed.

4. The vehicle driving support apparatus according to claim 1, wherein when it is deemed that the own vehicle at a present own vehicle acceleration and a present own vehicle speed cannot reach the target position, the control target time is set as the time needed to stop the own vehicle at the target position.

5. The vehicle driving support apparatus according to claim 1, wherein when the present inter-vehicle distance to the front vehicle is greater than the target inter-vehicle distance, the control target time is corrected so that the greater the inter-vehicle distance becomes the greater the target acceleration becomes.

6. The vehicle driving support apparatus according to claim 1, wherein when the absolute value of the speed of the own vehicle relative to the front vehicle is smaller than a preset threshold value, the control target time is corrected to be at a larger value than its uncorrected value.

7. The vehicle driving support apparatus according to claim 1, wherein when the absolute value of the difference between the present inter-vehicle distance to the front vehicle and the target inter-vehicle distance is smaller than a preset threshold value, the control target time is corrected to be at a larger value than its uncorrected value.

8. The vehicle driving support apparatus according to claim 1, further comprising:
   control target time correcting means for correcting the control target time involving a first correction wherein the control target time is made longer when the absolute value of the speed of the own vehicle relative to the front vehicle is smaller than a first preset threshold value, and a second correction wherein the control target time is made longer when the absolute value of the difference between the present inter-vehicle distance to the front vehicle and the target inter-vehicle distance is smaller than a second preset threshold value, and wherein only one of the first correction and the second correction, which corrects the control target time shorter than the other one of the first correction and the second correction, is executed.

9. The vehicle driving support apparatus according to claim 1, further comprising:
   estimated contact time computing means for computing an estimated contact time when the own vehicle is estimated to contact with the front vehicle on the basis of the present travel information of the own vehicle and the present front vehicle information,
   wherein the control target time is corrected based on the estimated contact time.

10. The vehicle driving support apparatus according to claim 1, wherein the control target time is limited to be less than or equal to an estimated contact time when the own vehicle is estimated to contact with the front vehicle on the basis of the present travel information of the own vehicle and the present front vehicle information.

11. The vehicle driving support apparatus according to claim 1, wherein, when it is deemed that another front vehicle has cut in between the front vehicle and the own vehicle, the control target time is corrected to be longer than its uncorrected value.

12. The vehicle driving support apparatus according to claim 1, further comprising:
   a throttle valve control device for controlling a throttle angle of a throttle valve; and
   a throttle angle detector for detecting a throttle angle,
   wherein when the target acceleration is greater than zero and less than a preset threshold value and the throttle angle is zero, the throttle valve control device keeps the throttle angle to be zero.

13. The vehicle driving support apparatus according to claim 1, wherein when the speed of the own vehicle relative to the front vehicle is smaller than a preset threshold value and greater than zero, the control target time is corrected to be at a larger value than its uncorrected value.

* * * * *